(12) United States Patent
Hsi et al.

(10) Patent No.: US 7,592,603 B2
(45) Date of Patent: Sep. 22, 2009

(54) COMBINED RADIATION DOSIMETER AND RATE METER

(75) Inventors: Peter C. Hsi, Dublin, CA (US); Yuzhong June Wang, Palo Alto, CA (US)

(73) Assignee: RAE Systems, Inc., San Jose, CA (US)

( * ) Notice: Subject to any disclaimer, the term of this patent is extended or adjusted under 35 U.S.C. 154(b) by 214 days.

(21) Appl. No.: 11/213,086

(22) Filed: Aug. 25, 2005

(65) Prior Publication Data
US 2007/0045546 A1    Mar. 1, 2007

(51) Int. Cl.
*G01T 1/02* (2006.01)
(52) U.S. Cl. .................... 250/394; 250/361 R
(58) Field of Classification Search ............. 250/361 R, 250/394
See application file for complete search history.

(56) References Cited

U.S. PATENT DOCUMENTS

| | | | | |
|---|---|---|---|---|
| 4,605,858 A * | 8/1986 | Terhune | ....... | 250/374 |
| 4,642,463 A * | 2/1987 | Thoms | ....... | 250/336.1 |
| 4,893,017 A * | 1/1990 | Kronenberg | ....... | 250/370.07 |
| 5,004,921 A * | 4/1991 | Moscovitch | ....... | 250/337 |
| 5,055,691 A * | 10/1991 | Burgess | ....... | 250/370.07 |
| 5,578,830 A * | 11/1996 | Olsher et al. | ....... | 250/390.03 |
| 6,300,635 B1 * | 10/2001 | Brambilla et al. | ....... | 250/370.07 |
| 6,452,203 B1 * | 9/2002 | Struye et al. | ....... | 250/581 |
| 7,456,405 B1 * | 11/2008 | Iwatschenko-Borho et al. | .. | 250/339.02 |
| 2002/0079439 A1 * | 6/2002 | Croydon et al. | ....... | 250/252.1 |
| 2003/0026374 A1 * | 2/2003 | Ruddy et al. | ....... | 376/153 |

OTHER PUBLICATIONS

"American National Standard Performance Criteria for Alarming Personal Radiation Detectors for Homeland Security", ANSI N42.32-2003, IEEE, New York, NY (Jan. 30, 2004) pp. 1-25.
"American National Standard for Portable Radiation Detection Instrumentation for Homeland Security", ANSI N42.33-2003, IEEE, New York, NY (Jan. 30, 2004) pp. 1-32.

* cited by examiner

*Primary Examiner*—David P Porta
*Assistant Examiner*—Jessica L Eley
(74) *Attorney, Agent, or Firm*—David T. Millers

(57) ABSTRACT

A radiation detector can perform both rate and dose measurements for personal safety and also to provide measurements that are sufficiently sensitive for security applications. In one embodiment, a radiation detector has a first measurement channel and a second measurement channel, where the second measurement channel can measure radiation at levels that would saturate the first measurement channel. The detector can automatically switch between the high and low sensitivity channels while continuously integrating the measured rates to determine a radiation dose. The detector can also conserve power by automatically shutting off the unused measurement channel and still give a personal safety warning when the radiation rate or the dose reaches respective alarm thresholds.

22 Claims, 2 Drawing Sheets

COMBINED RADIATION DOSIMETER AND RATE METER

BACKGROUND

Radiation detectors are needed today for both safety and security applications. For safety applications, a personal radiation detector may be needed to monitor both the rate of radiation exposure and a total dose. For example, a portable rate meter can monitor a subject's exposure to radiation and provide a warning if the rate of radiation exposure reaches an unacceptable level, and a portable dosimeter can measure the accumulated radiation exposure that a subject receives during a period of time. Traditionally, implementations of dose rate meters and dosimeters have differed significantly. For example, one class of rate meters employs Geiger-Müller tubes to detect or count the rate at which ionizing radiation passes into the Geiger-Müller tube. In contrast, dosimeters can be implemented simply be carrying film in a light-tight package and developing the film to measure the amount of radiation that has penetrated the packaging and exposed the film.

Radiation measurements for security purposes confront a different set of demands and concerns. For example, detecting a source of radiation, which may pose a security threat, generally requires the ability to sense relatively low levels of radiation because the device containing radioactive material may be hidden, shielded, or separated from the detector. As a result, the rate of radiation reaching a detector from such security threats may be low when compared to the rates consider unacceptable for personal safety. Radiation detectors for security applications thus may need to be orders of magnitude more sensitive than a personal radiation rate meters suitable for safety applications The differences in requirements for personal radiation rate meters and portable radiation detectors for security have led to adoption of separate standards for such detectors. For example, recent actions to improve homeland security have led to development of ANSI standard N42.32 for alarming personal radiation detectors and ANSI standard N42.33 for portable radiation detectors for security applications. However, in many situations, security personnel or others will want to have a personal radiation dosimeter and a safety alarm in addition to a portable radiation detector for detection of security threats. The need to purchase and carry two types of radiation detectors can be costly and cumbersome.

SUMMARY

In accordance with an aspect of the invention, a radiation detector can employ multiple measurement channels and perform both rate and dose measurements for personal safety and also to provide radiation rate measurements that are sufficiently sensitive for security applications. In one embodiment, a dual-channel radiation detector has a first channel including a scintillator and a photodiode. The scintillator has a sampling volume that provides photon events at a rate that is high enough for the radiation measurement accuracy needed in security application. The second channel provides a wide measurement range using a sensor that may consist of a photodiode without a scintillator to provide a lower count rate. Accordingly, the second channel can thus measure radiation at levels that would saturate counting if the scintillator were used. The detector can continuously integrate measured radiation rates to determine an accumulated dose while automatically switching between the high sensitivity channel and the wide rate channel as radiation rates change. The detector can then give a personal safety warning when the radiation rate or the dose rises above respective thresholds. Further, the detector can selectively operate only one of the measurement channels at a time to conserve power in a portable or hand held detector.

BRIEF DESCRIPTION OF THE DRAWINGS

Use of the same reference symbols in different figures indicates similar or identical items.

DETAILED DESCRIPTION

In accordance with an aspect of the invention, a radiation detector can include multiple channels that permit implementation of a dosimeter with alarms for personal safety and a rate meter with alarms and the accuracy needed for security or safety applications.

Figure 1:
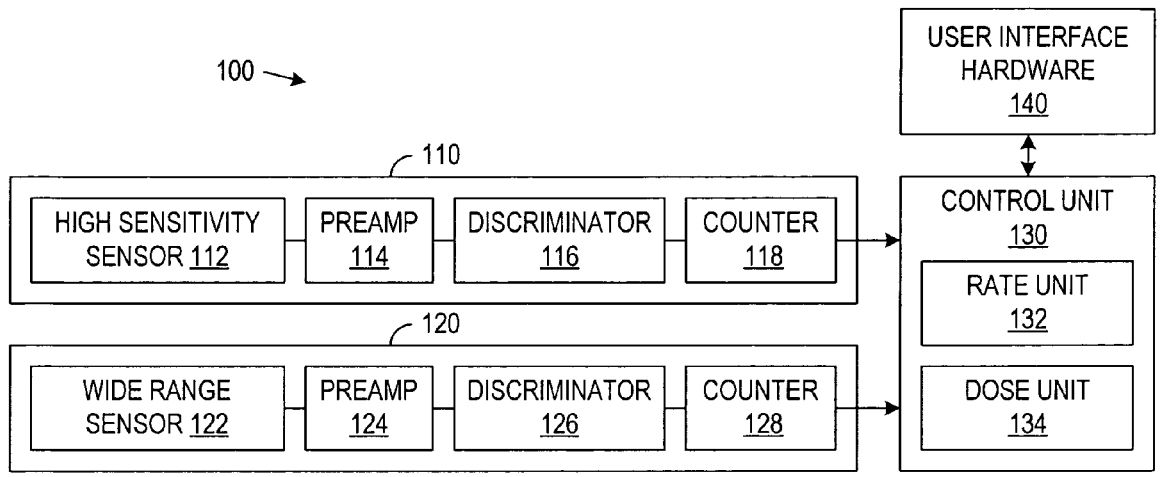
FIGS. 1 and 2 show block diagrams of multi-channel radiation detectors in accordance with embodiments of the invention capable of measuring radiation at levels associated with personal safety alarms and at levels associated with detection of security threats.

FIG. 1 illustrates a radiation detector 100 in accordance with an exemplary embodiment of the invention including two radiation measurement channels 110 and 120. Measurement channel 110 is for measurement of radiation at relatively low rates, e.g., about 1 to 4000 μR/h. In contrast, measurement channel 120 is designed to measure radiation at much higher rates, e.g., up to about 8 or 10 R/h. In one specific embodiment of the invention, channel 110 measures radiation rates in the range required for detection and interdiction of radioactive security treats as set forth in IEEE standard N42.32, and channel 120 is for measurements over a wide dynamic range for hazard assessment as set forth in IEEE standard N42.33. Accordingly, one embodiment of detector 100 complies with both IEEE standards N42.32 and N42.33.

In the illustrated embodiment, measurement channel 110 includes a high sensitivity sensor 112, a preamplifier or charge amplifier 114, a discriminator 116, and a counter 118. High sensitivity sensor 112 can be implemented using conventional sensing systems including but not limited to Geiger-Mueller tubes, solid state detectors, or scintillation detectors. Sensor 112 produces an electric charge or signal when radiation penetrates and interacts with sensor 112. Amplifier 114 then amplifies or converts the charge or signal from sensor 112 to produce an electrical signal having a voltage suitable for operation of discriminator 116 and counter 118. Discriminator 116 filters the signal from amplifier 114 to reduce or eliminate electronic noise and produces a signal containing pulses that occur when the input signal to discriminator 116 is above a threshold voltage. Counter 118 counts the number of pulses in the signal from discriminator 116.

Measurement channel 110 can be calibrated by exposing sensor 112 to radiation from a radioactive source that is situated to provide a known radiation rate and then determining a conversion factor from the ratio of the known radiation rate to the measured count rate. The product of the count of pulses in counter 118 during a specific time and the conversion factor then indicates a radiation rate without energy correction. Alternatively, an energy corrected radiation rate measurement might be obtained by taking into account the magnitude of each pulse in the output signal from discriminator 116.

Measurement channel 120 can be implemented using measurement technology that is the same as or different from that used in measurement channel 110, but measurement channel 120 is generally capable of measuring higher radiation rates and a wider measurement range than can be accurately measured with measurement channel 110. In the embodiment of FIG. 1, measurement channel 120 includes of a wide range sensor 122, a preamplifier or charge amplifier 124, a discriminator 126, and a counter 128. Wide range sensor 122 produces an electrical charge or signal when radiation interacts with sensor 122, but to provide a wider measurement range, sensor 122 is selected to provide a lower rate of pulses than does high sensitivity sensor 112 when exposed to the same radiation levels. This may be achieved, for example, by using a smaller or less efficient sensing system in sensor 122 than in sensor 112 or using a different type of sensor, e.g., a Geiger-Müller tube in sensor 122 and a scintillator in sensor 112.

Pre-amplifier or charge amplifier 124, discriminator 126, and counter 128 in measurement channel 120 operate in substantially the same manner as described above for amplifier 114, discriminator 116, and counter 118 in measurement channel 110, and measurement channel 120 can be calibrated in the same manner as measurement channel 110. However, since sensor 122 is less sensitive to radiation than is sensor 112, the count rate of counter 128 will be lower than the count rate for counter 118 for the same radiation rate, and therefore the conversion factor for the count rate from counter 128 will be less than the conversion factor for the count rate from counter 118.

Circuitry in detector 100 can process the count signals from measurement channels 110 and 120 in a user controlled manner to provide radiation rate and dose measurements and safety alarms. In the embodiment of FIG. 1, detector 100 includes a control unit 130 that is connected to measurement channels 110 and 120 and to user interface hardware 140. Control unit 130 can include dedicated circuitry, a general purpose microprocessor or microcontroller, or a combination of the two that implement the desired functions of detector 100. In particular, control unit 130 can perform functions including: selecting one of measurement channels 110 and 120 for a radiation rate measurement; determining a current radiation rate from the count rate in the selected channel 110 or 120; integrating the measured radiation rates over time to determine an accumulated dose; operating user interface hardware 140 to provide measurement results and/or alarms when the radiation rate or dose reach alarm threshold levels, and monitoring user interface hardware 140 to receive user initiated commands.

A rate unit 132, which may be implemented in hardware, software, or a combination of the two, determines radiation rates from the measured count rates from counters 118 and 128 and can select which measurement channel 110 or 120 to use. Channel selection can be based on the counts in one or both of counters 118 and/or 128. In particular, for low level background radiation, rate unit 132 can periodically read the count from high sensitivity channel 110, for example, by reading and resetting counter 118 once a second. The ratio of the change in the count since the previous reading and the time since the previous reading indicates a count rate, which count unit 132 can convert to a radiation rate, e.g., through multiplication by the conversion factor found for channel 110 during calibration. For high levels of radiation, counting in measurement channel 110 becomes "saturated" when pulses in the signal to counter 118 consistently overlap each other. A typical minimum pulse width achieved for conventional photodiodes and associated amplification circuits is about 10 μs (FWHM), so that count rates at or above about 100 kcps may be unreliable. When the count rate from counter 118 is above a threshold level, rate unit 132 can use the count from measurement channel 120, which provides a lower count rate due to the efficiency of sensor 122. Similarly, detector 100 can automatically switch from measurement channel 120 back to measurement channel 110 when the count rate from measurement channel 120 is less than a threshold level. The automatic change from one measurement channel 110 or 120 to the other 120 or 110 can provide accurate measurements over a wide range and be transparent to a user that sees the rate measurement displayed through user interface hardware 140.

In accordance with a further aspect of the invention, control unit 130 may automatically deactivate the unused measurement unit 110 or 120. In particular, control unit 130 can turn off power to one measurement unit 110 or 120 to preserve battery power in a portable detector when the other measurement channel 120 or 110 provides the more accurate rate measurement.

Control unit 130 in FIG. 1 also includes a dose unit 134. Dose unit 134 can determine a radiation dose by integrating the rate measurements from rate unit 132. Integration can be simply performed by accumulating weighted count rates or radiation rates. For example, if the radiation rate measurements are performed at a constant frequency, the accumulated dose depends on the sum of the measured rates. Alternatively, each measured count rate can be multiplied by a factor that depends on the source measurement channel 110 or 120 and on the time since the last count rate measurement. The accumulated dose value may be stored in non-volatile memory to preserve the accumulated dose value when detector 100 is turned off or the power source for detector 100 is removed. Control unit 130 can direct user interface hardware 140 to produce an audio, visual, or tactile alarm to draw a user's attention to a high accumulated dose.

FIG. 1 as noted above includes two measurement channels 110 and 120 and shared circuitry such as control unit 130 and interface hardware 140. In other embodiments of the invention, multiple measurement channels can share more or less circuitry. For example, some or all of amplifier 114, discriminator 116, and counter 118 may be shared by multiple measurement channels if appropriate multiplexing or selection circuitry is provided.

Figure 2:
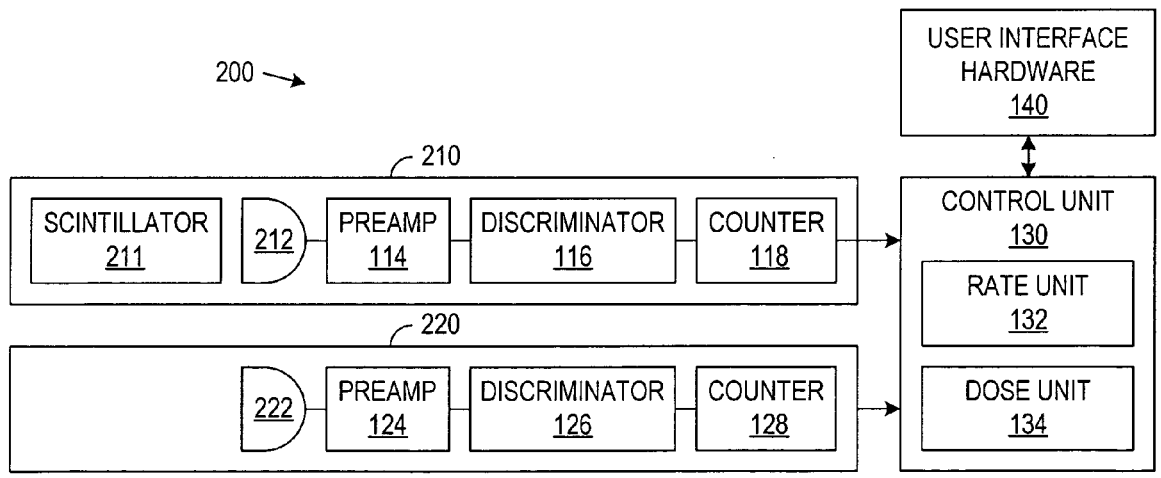

FIG. 2 shows a detector 200 having measurement channels 210 and 220 that contain exemplary radiation sensors. More specifically, the radiation sensor in high sensitivity measurement channel 210 includes a scintillator 211 and a light sensor 212. Scintillator 211 can made of any material that emits light or electromagnetic radiation of a detectable wavelength in response to ionizing radiation such as alpha rays, beta rays, gamma rays, neutrons, or other emissions from radioactive materials. In one specific embodiment, scintillator 211 is a crystal of cesium iodide (CsI) that is about 3 cm$^3$. Light sensor 212, which can be implemented, for example, using photodiode or a photomultiplier tube, is positioned to sense photon events corresponding to emission of light that ionizing radiation causes when entering scintillator 211. As a result, sensor 212 produces charge movements that charge amplifier 114 amplifies to produce an electrical signal have a voltage suitable for discriminator 116 and counter 118.

Measurement channel 220 achieves a wider measurement range using a sensor 222 having a much lower rate of capture and detection of radiation. For example, sensor 222 may consist of a photodiode without a scintillator. A photodiode will then produce charge movement each time incident radiation induces the photoelectric effect in the photodiode. A photodiode generally has a much smaller volume/area and lower efficiency for absorbing radiation in comparison to a high-Q scintillator 211, so that sensor 222, when implemented using only a photodiode, generates pluses less frequently than scintillator 211 for a fixed radiation level. In an alternative embodiment, measurement channel 220 may employ a scintillator (not shown) that is smaller than scintillator 211. The remainder of measurement channel 220 operates with control unit 130 and interface hardware 140 as described above with reference to FIG. 1.

Figure 3:
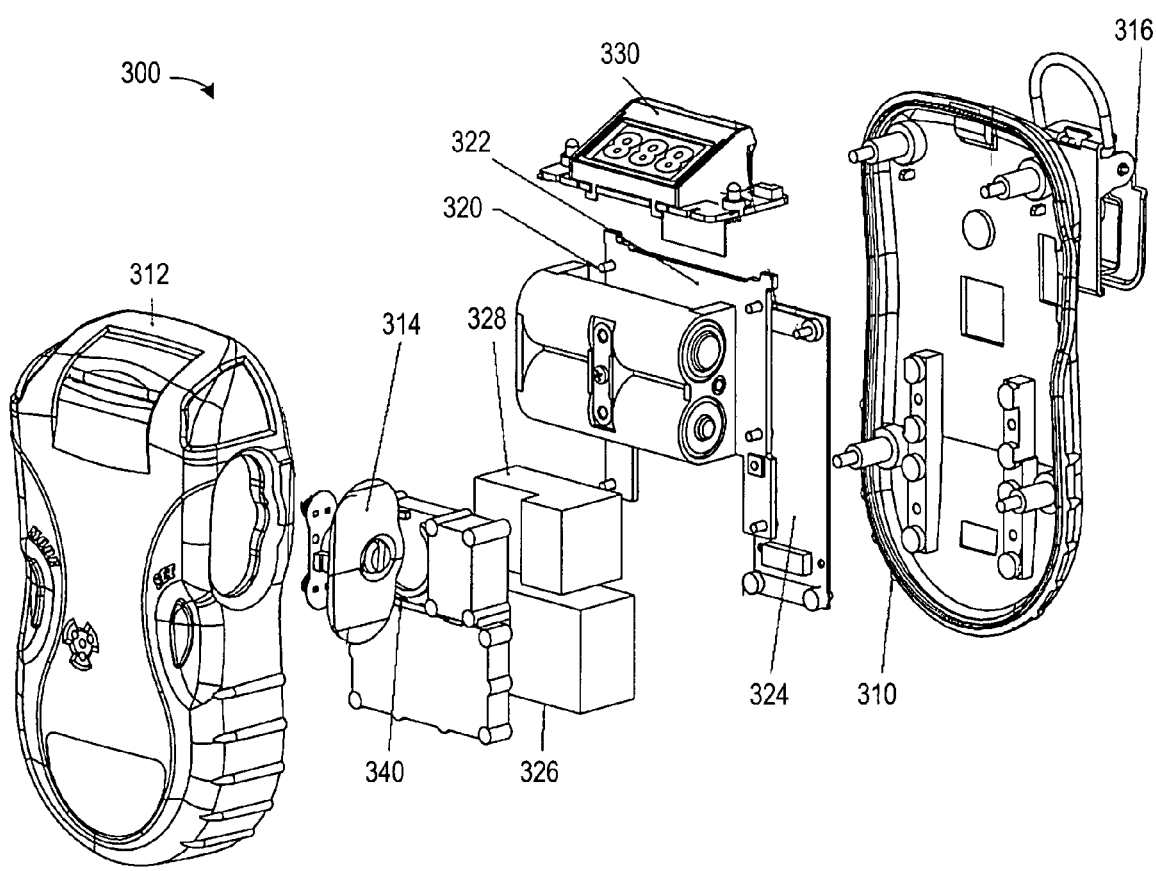
FIG. 3 shows an expanded view of a portable radiation detector in accordance with an embodiment of the invention.

Detectors 100 and 200 are preferably constructed as portable devices that a user can wear or carry. FIG. 3 illustrates an exploded view of a personal radiation detector 300 in accordance with one embodiment of the invention. Detector 300 has overall dimensions of about 125 mm by 68 mm by 35 mm and includes an external housing, which can be made of durable light-weight material such as plastic. In the illustrated embodiment, the housing of detector 300 includes a removable back 310, a housing base 312, a battery cover 314, and an anti-shock device 340. A clip 316 on back 310 allows detector 300 to clipped or worn on a user's apparel.

Electrical components of detector 300 include a battery 320, a main circuit board 322, a network board 324, a high sensitivity radiation sensor 326, a wide range radiation sensor 328, and a display 330. Main circuit board 322 can include circuitry such as control unit 130 described above. Display 330, which is part of the interface hardware, may be an LCD or other display capable of displaying measurement results, and network board 324 can implement a wireless communication protocol such as Bluetooth that permits detector 300 to communicate with a network of other devices.

Radiation sensors 326 and 328 of FIG. 3 can correspond to measurement channels 110 and 120 of FIG. 1 or measurement channels 210 and 220 of FIG. 2. In particular, radiation sensor 326 has high sensitivity for low range measurements and may include a scintillator, a photodiode, and a preamplifier for measuring lower radiation rates. Radiation sensor 328 has lower sensitivity but a wider measurement ranges for sensing higher levels of radiation and may include a photodiode without a scintillator.

Although the invention has been described with reference to particular embodiments, the description is only an example of the invention's application and should not be taken as a limitation. For example, although the above-described embodiments employ two measurement channels to extend the range for rate and dose measurement, three or more measurement channels could similarly be used to if necessary or desired to improve accuracy and further extend the applicable measurement ranges. Various other adaptations and combinations of features of the embodiments disclosed are within the scope of the invention as defined by the following claims.

What is claimed is:

1. A portable radiation detector comprising:
   a radiation sensing system that includes a first measurement channel and a second measurement channel, wherein the first and second measurement channels measure the same radiation but the second measurement channel is less sensitive than the first measurement channel;
   a measurement unit coupled to the radiation sensing system, wherein the measurement unit uses a signal from one of the first and second measurement channels to determine a measurement of radiation, wherein the measurement unit comprises:
      a rate unit operably coupled to the first and second measurement channels,
   wherein the rate unit determines a radiation rate; and
      a dose unit operably coupled to the first and second measurement channels,
   wherein the dose unit determines a radiation dose received by a user transporting the detector; and
   a control unit that switches the measurement unit from using the first measurement channel to using the second measurement channel in response to a count rate from the first measurement channel indicating that the count rate from the first measurement channel is unreliable.

2. The detector of claim 1, wherein the rate unit determines the radiation rate from a measurement signal that is selected from a set of signals including: a first signal from the first measurement channel; and a second signal from the second measurement channel.

3. The detector of claim 2, wherein the first signal indicates a first count found using the first measurement channel and the second signal indicates a second count found using the second measurement channel.

4. The detector of claim 2, wherein the rate unit operates in a first mode in which the radiation rate is determined from the first signal and in a second mode in which the radiation rate is determined from the second signal.

5. The detector of claim 4, wherein the control unit switches the rate unit from the first mode to the second mode when a determined radiation rate rises above a threshold level.

6. The detector of claim 5, wherein the control unit switches the rate unit back to the first mode from the second mode when a determined radiation rate falls below a threshold level.

7. The detector of claim 4, wherein power to the second measurement channel is off when the rate unit operates in the first mode, and power to the first measurement channel is off when the rate unit operates in the second mode.

8. The detector of claim 1, wherein when determining the radiation dose, the dose unit repeatedly increments an accumulated radiation dose by amounts determined from measurement signals selected from a set of signals including a first signal from the first measurement channel and a second signal from the second measurement channel.

9. The detector of claim 8, wherein the first signal indicates a first count found using the first measurement channel and the second signal indicates a second count found using the second measurement channel.

10. The detector of claim 8, wherein the dose unit operates in a first mode in which the accumulated radiation dose is incremented by amounts determined from the first signal and in a second mode in which the accumulated radiation dose is incremented by amounts determined from the second signal.

11. The detector of claim 10, wherein the control unit switches the dose unit from the first mode to the second mode when a determined radiation rate rises above a threshold level.

12. The detector of claim 11, wherein the control unit switches the dose unit back to the first mode when a determined radiation rate falls below a threshold level.

13. The detector of claim 10, wherein power to the second measurement channel is off when the dose unit operates in the first mode, and power to the first measurement channel is off when the dose unit operates in the second mode.

14. The detector of claim 1, wherein the first measurement channel comprises a scintillator and a light sensor positioned to receive light from the scintillator.

15. The detector of claim 14, wherein the second measurement channel comprises a second light sensor positioned away from any scintillator so that count pulses in the second channel result from radiation striking the second light sensor.

16. The detector of claim 14, wherein a radiation sensing portion of the second measurement channel consists of a photodiode.

17. The detector of claim 14, wherein the second measurement channel comprises a Geiger-Müller tube.

18. The detector of claim 1, further comprising a control system operable to produce an alarm when the rate unit identifies a radiation rate above a threshold rate and when the dose unit identifies a total dose over a threshold dose.

19. The detector of claim 1, wherein the detector is operable in a first mode in which the first measurement channel is functioning and power to the second measurement channel is off, and operable in a second mode in which the second measurement channel is functioning and power to the first measurement channel is off.

20. The detector of claim 1, wherein the rate unit and the dose unit comprise software executed by a processor.

21. The detector of claim 1, wherein the count rate indicating that the count rate from the first measurement channel is unreliable indicates a radiation rate at which pulses that the first measurement channel counts consistently overlap.

22. The detector of claim 1, wherein the control unit switches the measurement unit from using the second measurement channel to using the first measurement channel in response to a measurement signal from the second measurement channel indicating that a count rate from the first measurement channel is more accurate.

* * * * *